(12) United States Patent
Soehner et al.

(10) Patent No.: US 10,558,889 B2
(45) Date of Patent: Feb. 11, 2020

(54) FREQUENCY-BASED PROJECTION SEGMENTATION

(71) Applicant: Dr. Ing. h.c. F. Porsche Aktiengesellschaft, Stuttgart (DE)

(72) Inventors: Sebastian Soehner, Karlsruhe (DE); Christian Schneider, Tuebingen (DE); Muhammad Umair Akmal, Ettlingen (DE); Tim Kunz, Kelkheim (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 123 days.

(21) Appl. No.: 15/893,743

(22) Filed: Feb. 12, 2018

(65) Prior Publication Data
US 2018/0268254 A1 Sep. 20, 2018

(30) Foreign Application Priority Data
Mar. 20, 2017 (DE) .......................... 10 2017 105 910

(51) Int. Cl.
*G06K 9/00* (2006.01)
*G06K 9/62* (2006.01)
(Continued)

(52) U.S. Cl.
CPC ....... *G06K 9/6245* (2013.01); *G06K 9/00791* (2013.01); *G06K 9/3233* (2013.01);
(Continued)

(58) Field of Classification Search
CPC ............. G06K 9/6245; G06K 9/00791; G06K 9/3233; G06K 9/4604; G06K 9/6255;
(Continued)

(56) References Cited

U.S. PATENT DOCUMENTS

| 5,675,407 A * | 10/1997 | Geng ................. G01B 11/2509 356/147 |
| 2007/0206204 A1 * | 9/2007 | Jia ....................... G01B 11/2527 356/604 |

(Continued)

FOREIGN PATENT DOCUMENTS

| DE | 102011109440 A1 | 4/2012 |
| DE | 102015210934 A1 | 12/2016 |
| WO | WO 2010092533 A1 | 8/2010 |

OTHER PUBLICATIONS

Matthew J. Baker, et al., "Neural network digital fringe calibration technique for structured light profilometers", Applied Optics, vol. 45, No. 8, Mar. 10, 2007, pp. 1-12.

*Primary Examiner* — Jose L Couso
(74) *Attorney, Agent, or Firm* — Leydig, Voit & Mayer, Ltd.

(57) ABSTRACT

A method for segmenting a projected pattern in an image recorded by a camera includes recording, by a camera in a learning phase, a multiplicity of images produced by virtue of a light source projecting the pattern from a plurality of different angles onto a projection surface in a clean room, wherein the projection surface has a plurality of respectively different distances from the light source for each angle; transforming the multiplicity of images into a frequency domain representation; obtaining a value range of occurring frequencies from the frequency domain representation of the multiplicity of images; and masking, in an application phase, frequencies other than the frequencies lying in the value range in a frequency domain representation of the image recorded by the camera, wherein a difference image produced in this manner is transformed back from the frequency domain representation.

9 Claims, 6 Drawing Sheets

(51) Int. Cl.
*G06K 9/32* (2006.01)
*G06K 9/46* (2006.01)

(52) U.S. Cl.
CPC ......... *G06K 9/4604* (2013.01); *G06K 9/6255* (2013.01); *G06K 9/6262* (2013.01)

(58) Field of Classification Search
CPC .... G06K 9/6262; G06K 9/62; G06K 9/00201; G06K 9/2036; G06K 9/00624; G06K 9/482; G06K 2209/40; G06K 2209/401; H04N 13/239; H04N 13/204; H04N 13/254; H04N 13/282; G06T 7/11; G06T 7/168; G06T 7/73; G06T 7/521; G06T 7/55; G06T 7/50; G06T 5/009; G06T 2207/20221; G06T 2207/30252; G06T 2207/20056; G01B 11/25; G01B 11/254; G01B 11/2527; G01B 11/2513; G01B 11/2545; G01B 11/2536; G01B 11/14; G01B 11/002; G01B 11/005; G01B 11/2531; G01B 9/02032; G01B 9/02047; G01B 2210/52; G01M 11/065; G01M 11/068; G03B 15/02; G03B 37/04; G05D 1/0246; G05D 1/0274; G05D 2201/0213; G06F 3/0325; G09G 3/025

See application file for complete search history.

(56) References Cited

U.S. PATENT DOCUMENTS

| | | |
|---|---|---|
| 2010/0189372 A1 | 7/2010 | Chen et al. |
| 2010/0299103 A1* | 11/2010 | Yoshikawa ............ G01B 11/25 702/167 |
| 2012/0092680 A1* | 4/2012 | Teodorescu ........ G01B 11/2509 356/625 |
| 2012/0154577 A1* | 6/2012 | Yoshikawa ............. H04N 7/18 348/140 |
| 2015/0070472 A1* | 3/2015 | Chen ................. G01B 11/2531 348/47 |
| 2016/0275682 A1* | 9/2016 | Natroshvili .......... H04N 17/002 |
| 2018/0318051 A1* | 11/2018 | Lu ...................... A61B 1/00009 |

* cited by examiner

FREQUENCY-BASED PROJECTION SEGMENTATION

CROSS REFERENCE TO RELATED APPLICATIONS

This application claims benefit to German Patent Application No. DE 10 2017 105 910.5, filed Mar. 20, 2017, which is hereby incorporated by reference herein.

FIELD

The present invention relates to a method and a system for segmenting image content containing a projected pattern.

BACKGROUND

A triangulation, i.e. ranging by accurate determining of an angle within a triangle formed in space by two points of the optical system and a respective point of an object, is a standard method used in the 3D reconstruction of a space situated in front of an optical system. The triangulation can be carried out passively or actively. Conventionally, the passive triangulation is known, in which respectively one observer, for example a camera, is situated at the two points of the optical system. By way of example, this principle is realized in a stereo camera which records an object in space from different angles. However, the active triangulation, in which one observation point is replaced by a light source, i.e. the triangle consists of a light beam, irradiated object and camera, is the measurement principle most commonly used in optical ranging. Here, the ranging may also take place along a visual plane if a light stripe is projected in place of a light beam. A profile of the light stripe imaged in the camera can be converted into a distance profile along the light stripe by means of triangulation. Then, the fast measurement of a complete space is obtained by a structured light projection, in which different stripe patterns, for example with a stripe thickness that doubles in each recorded image of the sequence, are projected onto the object in quick temporal succession. Thus, the 3D reconstruction of the space can be calculated in real time from the known set of the stripe patterns and the images thereof in the camera. Here, the quality of the 3D reconstruction depends strongly on the correct identification of illuminated and non-illuminated areas.

3D reconstruction occurs in various technical applications, for example in a contactless measurement of objects, in medicine and dentistry, but especially in industry when controlling the form of workpieces or when designing a new form for a product. In real time, it is of essential importance to autonomously moving systems, the surrounding space of which needs to be explored. It is likewise used in a driver assistance system for assisting a driver of a motor vehicle and it forms the basis for a computer-controlled image analysis.

In a motor vehicle, the light source advantageously already is provided by a headlamp which, together with a camera installed in the front region, forms the optical system. Here, accurate knowledge about the vehicle-specific light distribution of the headlamp is of great importance for the quality of the image processing, making a calibration of a headlamp-camera system indispensable. By way of example, the document DE 10 2011 109 440 A1 describes a method which can be used to adjust and/or calibrate a headlamp of a vehicle.

By means of the headlamp, it is possible to project a pattern onto a vehicle near field, said pattern being used for image processing within an image recorded by the camera. Depending on a surface structure in the vehicle near field or on objects situated therein, the projected pattern is recorded in deformed fashion by the camera. A certain region which is of particular interest for a further evaluation may be stipulated for the image recorded by the camera. Such a region is commonly referred to as "region of interest", also abbreviated as ROI in technical jargon.

According to the prior art, a feature search is carried out within the statically predetermined ROI during the image processing and at least one feature is extracted. Here, a feature consists of an imaging of a pattern projected by the headlamp which should represent a particularly good characteristic in the image. By way of example, such a pattern may consist of a checkerboard pattern. It should still be uniquely identifiable, even in the case of a strong deformation. The term "feature" is also used for this in technical jargon.

By way of example, the feature search may contain an edge detection. Various algorithms are known to this end. The Canny algorithm is specified here as an example; it supplies an image only still containing edges in the ideal case after carrying out various convolution operations.

The position of the found feature in the image of the camera and a geometric data record from the projected form of the headlamp form a so-called feature pair. The 3D reconstruction of the space situated in front of the headlamp-camera system is effectuated on the basis of the found feature pairs by means of triangulation; said 3D reconstruction may also consist of a pure depth map.

Identifying an erroneous feature occurs in the aforementioned feature search, the origin of said feature not lying in the projection of a pattern by the headlamp but said erroneous feature nevertheless being assigned a geometric data record from the headlamp and forming an erroneous feature pair therewith. What may occur particularly in the case of vehicle operation is that image components which do not contain a projected pattern repeatedly occur in the statically predetermined ROI, with the feature search however leading to erroneous feature pairs in said image component. A triangulation based on such an erroneous feature pair thus leads to an erroneous depth map.

In order to solve a problem of the static ROI—that it may contain image components without projected patterns—the prior art has proposed an adaptive restriction of the ROI to the projected pattern over the course of time. To this end, a light/dark boundary, abbreviated HDG in the German technical jargon, is extracted for each image recorded by the camera between the comparatively light projected pattern and the comparatively dark vehicle near field, and the ROI is adaptively segmented in this respect. The further image processing then only occurs in the continuously adapted ROI. However, a disadvantage of this procedure is that objects may appear in the regions in the vehicle near field predetermined by the light/dark boundary, said objects having a certain brightness but not originating from the projected pattern and then having erroneous feature pairs as a consequence.

SUMMARY

In an embodiment, the present invention provides a method for segmenting a projected pattern in an image recorded by a camera. The method includes recording, by a camera in a learning phase, a multiplicity of images produced by virtue of a light source projecting the pattern from a plurality of different angles onto a projection surface in a clean room, wherein the projection surface has a plurality of respectively different distances from the light source for each angle; transforming the multiplicity of images into a frequency domain representation; obtaining a value range of occurring frequencies from the frequency domain representation of the multiplicity of images; and masking, in an application phase, frequencies other than the frequencies lying in the value range in a frequency domain representation of the image recorded by the camera, wherein a difference image produced in this manner is transformed back from the frequency domain representation.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
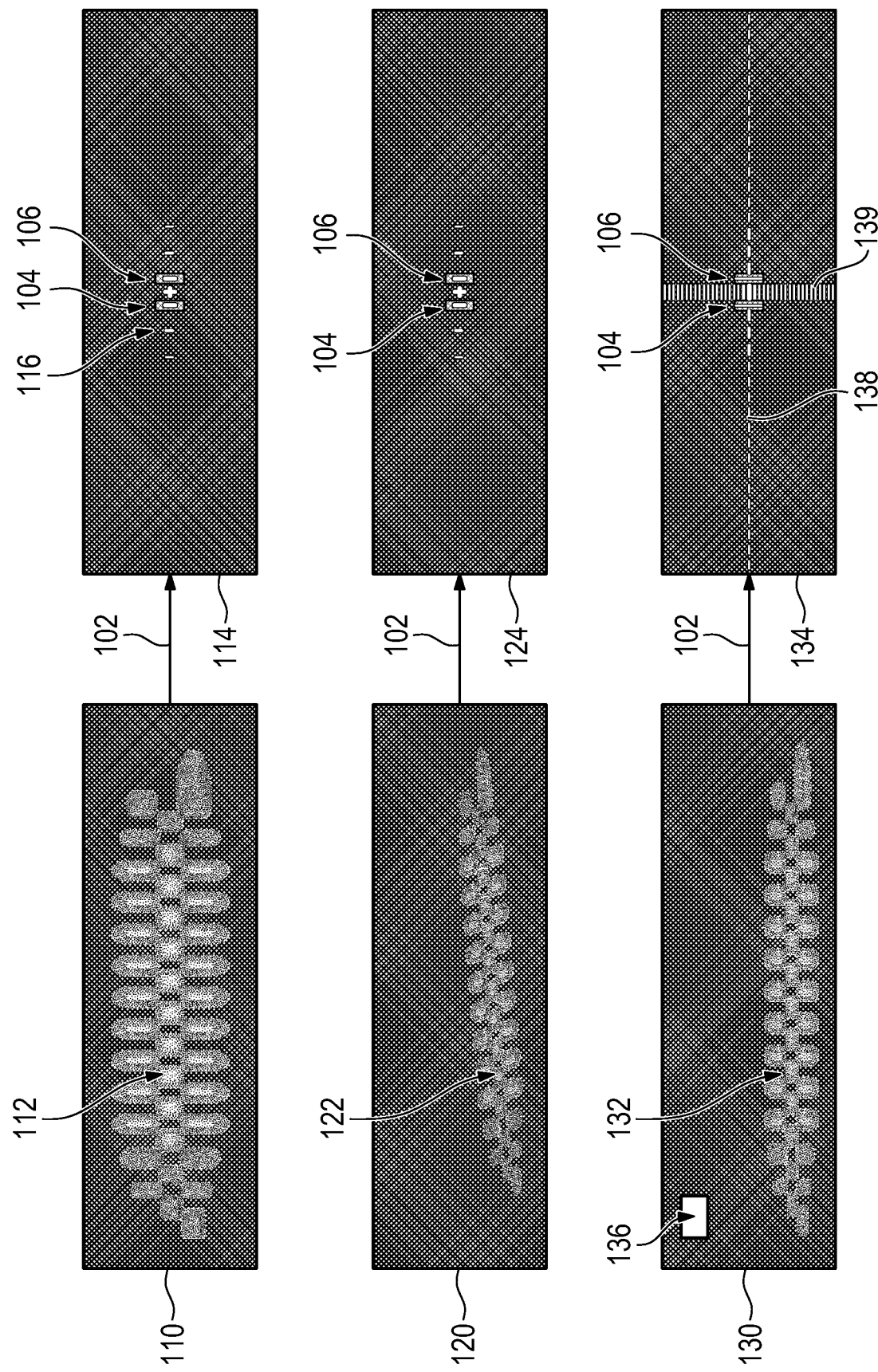
FIG. 1 shows images, recorded by a camera, of checkerboard patterns projected into a vehicle near field from different angles and distances, and the frequency domain representation thereof according to a method of an embodiment of the invention.

Embodiments of the present invention provide methods and systems for a segmentation of an image recorded by a camera which, for the further image processing, only uses those regions which originate from a pattern projected into a vehicle near field.

According to an embodiment of the invention, a method for segmenting a projected pattern in an image recorded by a camera is presented. Initially, in a learning phase, a multiplicity of images recorded by the camera are produced by virtue of a light source projecting the pattern from a plurality of different angles onto a projection surface in a clean room and the projection surface having a plurality of respectively different distances from the light source for each angle. Here, the room is only prepared as a clean room for recording these images, with no interfering objects being situated therein. Each image of the multiplicity of images is transformed into a frequency domain representation, with a value range of occurring frequencies being obtained by superposing all frequency domain representations of the multiplicity of images. In the application phase, other frequencies than the frequencies lying in this value range are masked in a frequency domain representation of the image recorded by the camera, a difference image produced in this manner is transformed back from the frequency domain representation, and said difference image then is made available for further image processing.

In a possible configuration, the multiplicity of images obtained in the learning phase form a ground truth, from which a frequency corridor is determined. In technical jargon, an image information item or, equally, the frequency domain representation thereof, which, like in the aforementioned learning phase for example, only contains the pure pattern projected without further influences or aberrations, is referred to as ground truth. Then, in a two-dimensional frequency domain representation, at least the range between a lowest frequency and a highest frequency of the ground truth in each of the two dimensions defines a frequency corridor, outside of which other frequencies occurring in the application phase are masked. In order to allow some small tolerance in this case, the frequency corridor may also be slightly enlarged for safety purposes. Advantageously, a headlamp is used as a light source in the case of a motor vehicle.

The transformation of an image into the frequency domain can be carried out by means of a Fast Fourier Transform. This is particularly advantageous if the image processing should be effectuated in real time in the application phase. In the same way, the use of an inverse Fast Fourier Transform is advantageous during the back transformation from the frequency domain.

In the learning phase, it is advantageous to select the angles and distances used in the production of the multiplicity of images with a systematic increment between a respectively smallest value and a respectively largest value. Here, for each selected distance, respectively one image of the projected pattern is taken by the camera for each angle.

In a possible configuration of a method according to the invention, the frequency domain representations of the images recorded by the camera in the learning phase are individually stored with the respective value for angle and distance, wherein a reference map is created, said reference map uniquely linking the frequency domain representation of the respective image to the angle and distance of the projected pattern.

Advantageously, a checkerboard pattern is selected for the pattern to be projected. Uniformly alternating bright and dark area elements correspond to characteristic frequencies in the frequency domain representation, the values of said characteristic frequencies lying ever higher in the frequency domain representation the smaller the area elements appear in, for example, the vehicle near field. Hence, it is possible to assign to the characteristic frequencies a distance at which the projected pattern appears in the image recorded by the camera.

In a configuration of a method according to the invention, other frequencies than the frequencies lying in the value range based on the ground truth are masked from the frequency domain representation of the image recorded by the camera in the application phase, and angles and frequencies corresponding to the reference map are determined. For further image processing, it is advantageous to use Gabor wavelets as a basis for an image processing kernel, the orientation and frequency of said Gabor wavelets within the frequency corridor corresponding to the values for the found angles and frequencies from the reference map. Then, the segmentation of the projected pattern in the image recorded by the camera in the application phase is carried out using this image processing kernel.

FIG. 1 shows images 110, 120, 130, recorded by a camera, of a checkerboard pattern 112, 122, 132 projected into a clean room from different angles and distances, and the frequency domain representation 114, 124, 134 of said images. The distance of the projected checkerboard pattern 112 is 2.5 m in image 110. The distance is 5.5 m in image 120 and the projected checkerboard pattern additionally is rotated by 5°. In image 130, the checkerboard pattern is projected without rotation from a distance of 5.5 m. Additionally, the image 130 has a rectangular falsification 136. All three images 110, 120, 130 have been converted into their frequency domain representation 114, 124, 134 by way of a Fast Fourier Transform 102. What all three frequency domain representations 114, 124, 134 have in common are the brightly illustrated frequencies 104 and 106, which alone correspond to the projected checkerboard pattern in a spatial domain of the images 110, 120, 130. Further visible frequencies 116 are artifacts. The rectangular falsification 136 leads to a horizontal and vertical stringing together of frequencies 138 and 139 in the frequency domain representation 134.

Figure 2:
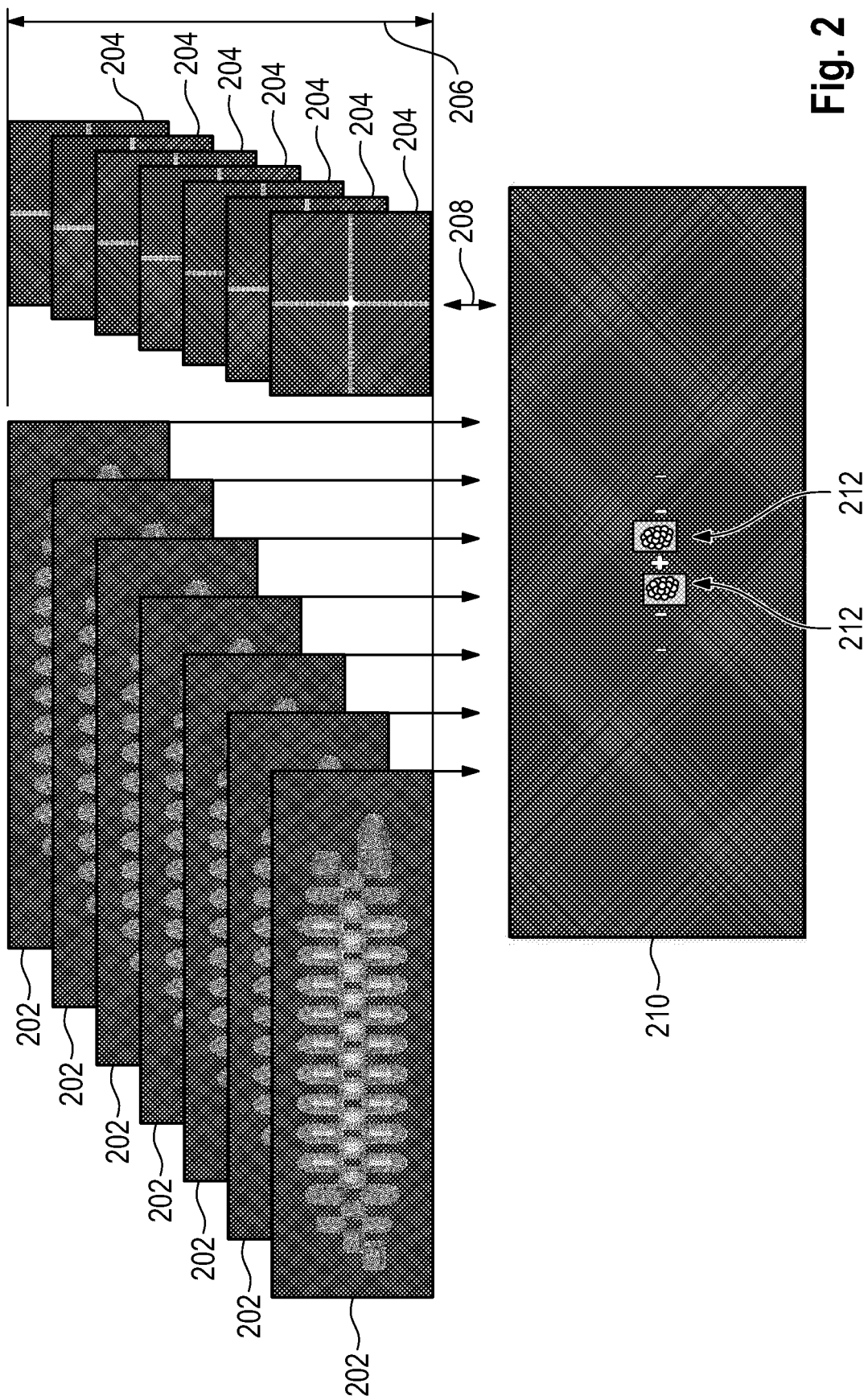
FIG. 2 shows a schematic illustration of a multiplicity of images of a learning phase and the superposition thereof in the frequency domain representation according to a method of an embodiment of the invention.

FIG. 2 schematically shows the generation of a multiplicity of images 202 in the learning phase, in which a checkerboard pattern is projected into a clean room. Each individual one of the images 202 has been recorded for a different angle and/or distance of the projected pattern. The individual images 202 are converted into a frequency domain representation 204. A value range 212 of occurrent frequencies becomes visible in 210 from the superposition 208 of all frequency domain representations 204, as a result of which it is possible to set a frequency corridor. Moreover, the frequency domain representations 204 form a data basis 206 for a reference map which facilitates the assignment of frequencies occurring in a frequency domain representation to an angle and distance of the projected checkerboard pattern.

Figure 3:
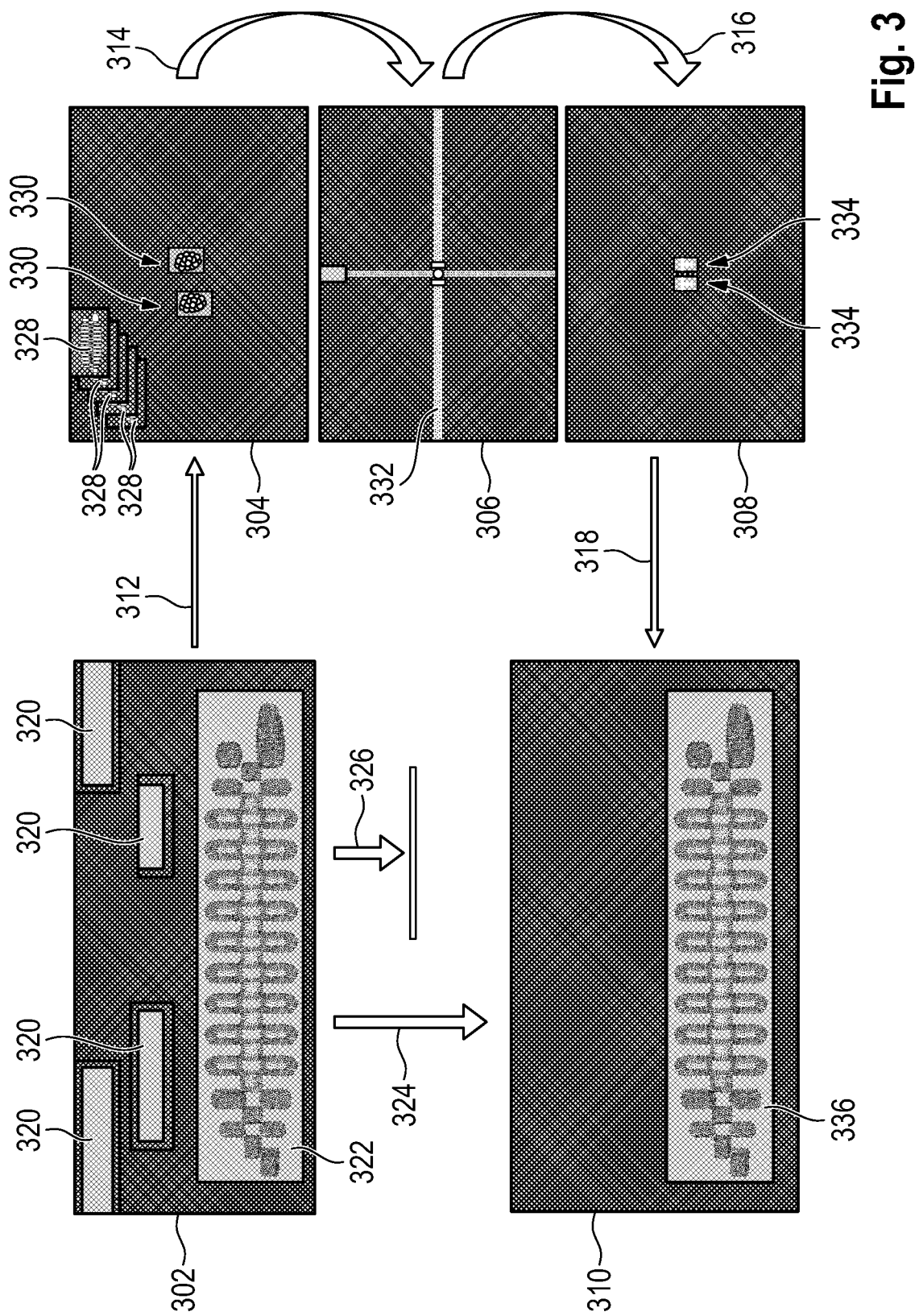
FIG. 3 shows a schematic illustration of steps of a method according to an embodiment of the invention for segmenting the projected pattern.

FIG. 3 shows the processes during the application phase when carrying out an embodiment of a method according to the invention. By way of example, a real image 302 recorded by the camera also contains unwanted image components 320 in addition to the projected checkerboard pattern 322. After a transformation 312 into a frequency domain, the frequencies 332 caused by unwanted image components 320 are masked by applying 314 to the frequency domain representation 306 of the recorded image 302 the frequency corridors 330 obtained from the multiplicity of images 328 during the learning phase 304 and a difference image 308 is obtained by way of this process 316. The difference image 308 only still contains the frequencies 334 which, after a back transformation 318 into the spatial domain, lead to the projected checkerboard pattern 336. Schematically, this means that the method according to the invention blocks the unwanted image components, as indicated by the arrow 326, but segments the projected checkerboard pattern for further image processing, as indicated by arrow 324. Moreover, using the reference map, an angle and a distance of the projected checkerboard pattern can be assigned for the further image processing by way of the frequencies 334 ascertained in the difference image 308.

Figure 4:
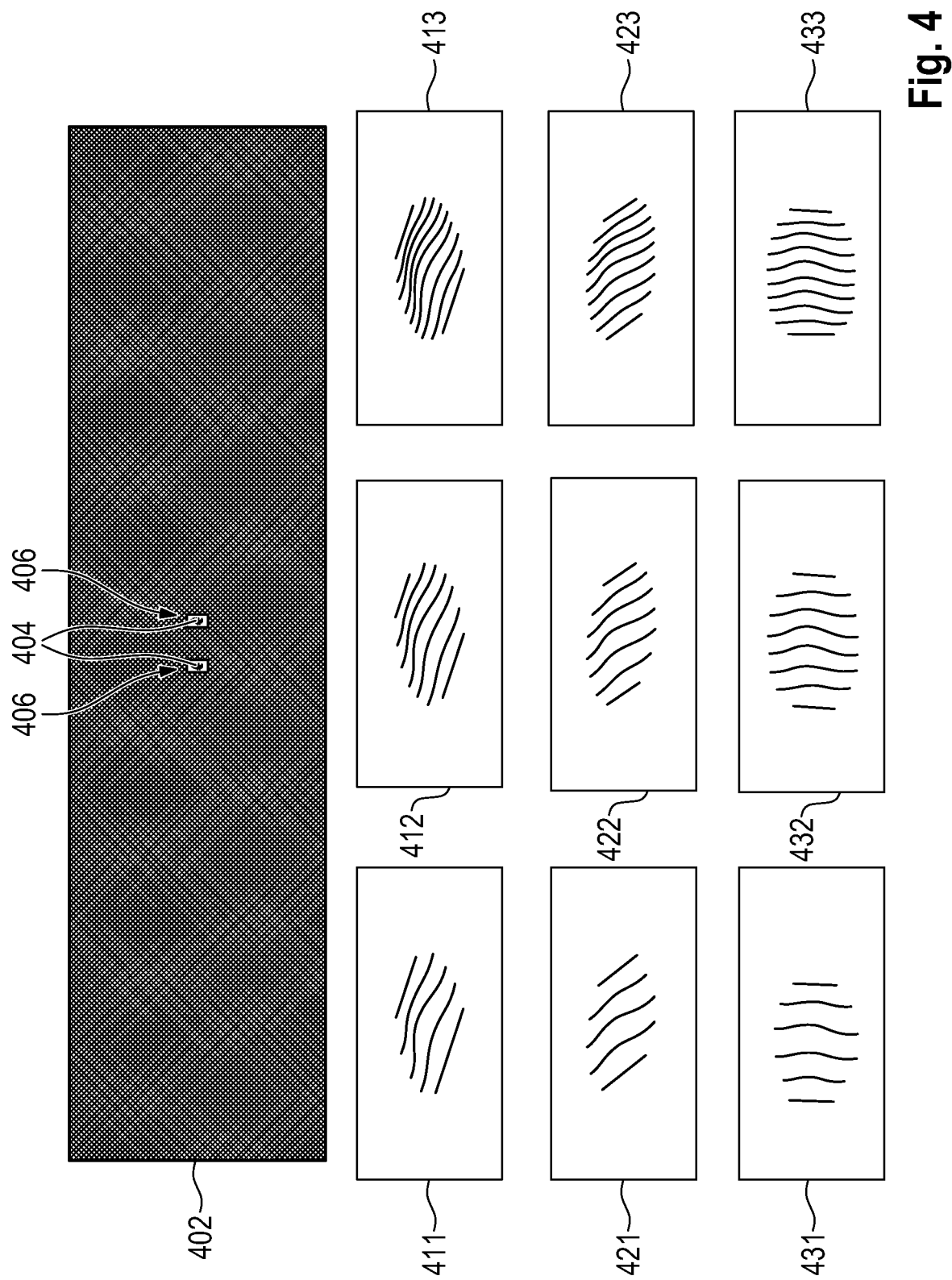
FIG. 4 shows a difference image in a frequency domain representation and a selection of Gabor wavelets according to a method of an embodiment of the invention.

At the top, FIG. 4 shows a difference image 402 which arose from the frequency domain representation of a real image recorded by the camera. An angle and a distance of the projected checkerboard pattern are assigned by means of the reference map to the frequencies 404 established in the frequency corridors 406 of the ground truth. By way of example, this results in values of 180+/−22.5 degrees for the angle and 0.02+/−0.005 for the frequency, wherein the variation about the mean value corresponds to a safety corridor. Specifying a frequency is an obvious representation in the frequency domain for a checkerboard pattern and this is advantageously used here in place of a distance as this yields a suitable selection of Gabor wavelets 411, 412, 413, 421, 422, 423, 431, 432, 433 for the further image processing. Image 422 shows a two-dimensional Gabor wavelet with an orientation angle corresponding to the aforementioned mean values of 25 degrees and a wavelength with a value of 7. According to the aforementioned safety corridors, this leads to the emergence of the images 411, 412, 413 with an orientation angle of 55 degrees, the images 421, 422, 423 with an orientation angle of 25 degrees and the images 431, 432, 433 with an orientation angle of 5 degrees, and also of the images 411, 421, 431 with a wavelength with a value of 5, the images 412, 422, 432 with a wavelength with a value of 7 and finally the images 413, 423, 433 with a wavelength with a value of 9.

Figure 5:
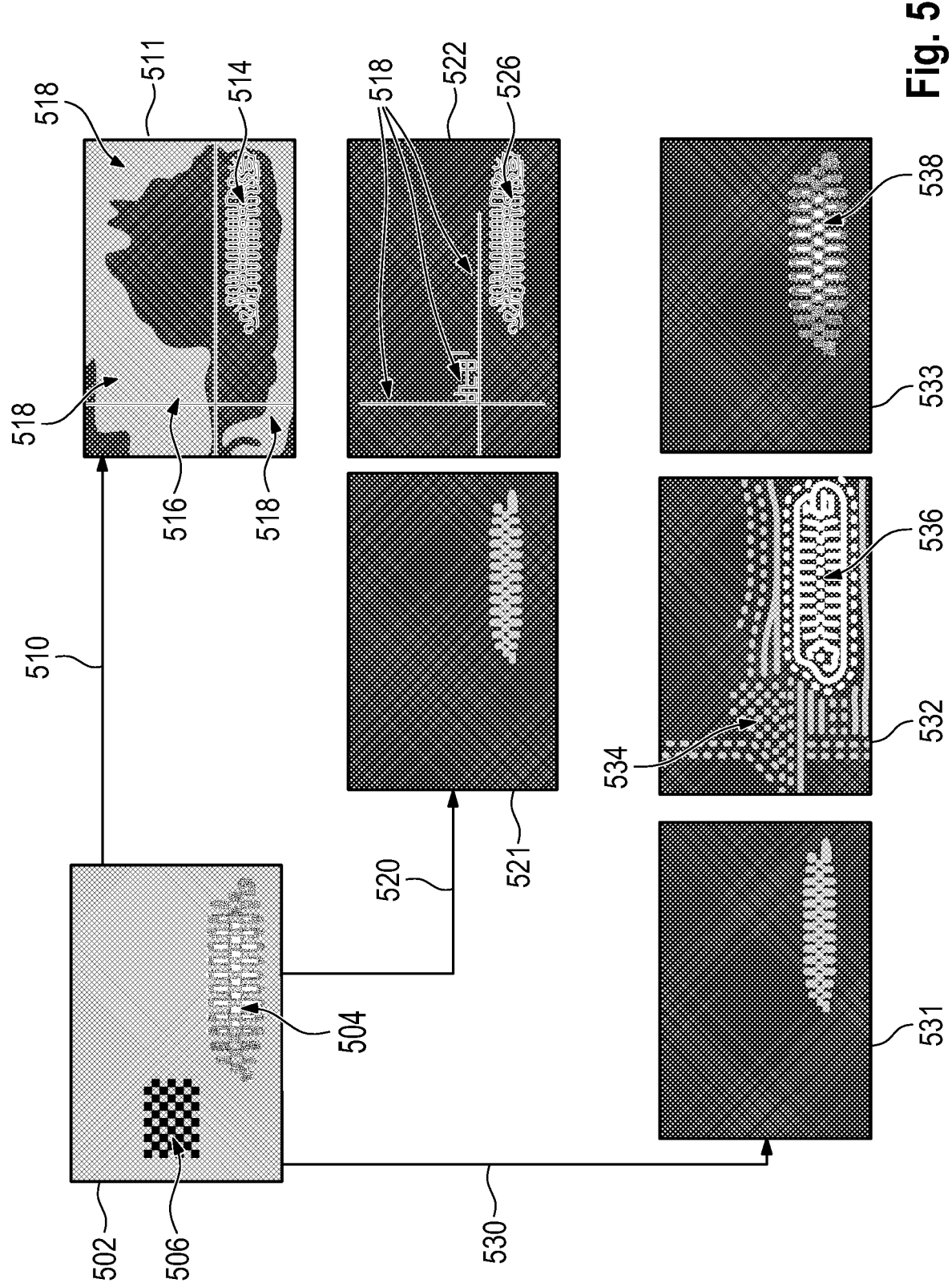
FIG. 5 contrasts various methods from the prior art for segmenting projected checkerboard pattern.

FIG. 5 compares various methods from the prior art for segmenting the projected checkerboard pattern. The starting point is a test image 502 which, in addition to the projected checkerboard pattern 504, also has other image components, for example a checkerboard pattern 506 painted in the vehicle near field and a bright horizontal and vertical light stripe. If the test image 502 now is subject to simple edge detection 510, for example using the Canny edge detector, the result 511, in addition to the correctly identified projected checkerboard pattern 514, also would contain the painted checkerboard pattern 516 and a number of further unwanted artifacts 518. If the edge detection 520 is restricted to the ROI, for example by restricting the ROI to regions 521 defined by means of the light/dark boundary, the result 522 could nevertheless show image components with artifacts 518 in addition to the projected checkerboard pattern. Only the adaptive determination 530 of the ROI, in which, in 531, regions within a light/dark boundary are initially identified and then, in 532, the ROI 536 is restricted to the projected checkerboard pattern while dark image components 534 are ignored, produces the desired result 538 in 533.

Figure 6:
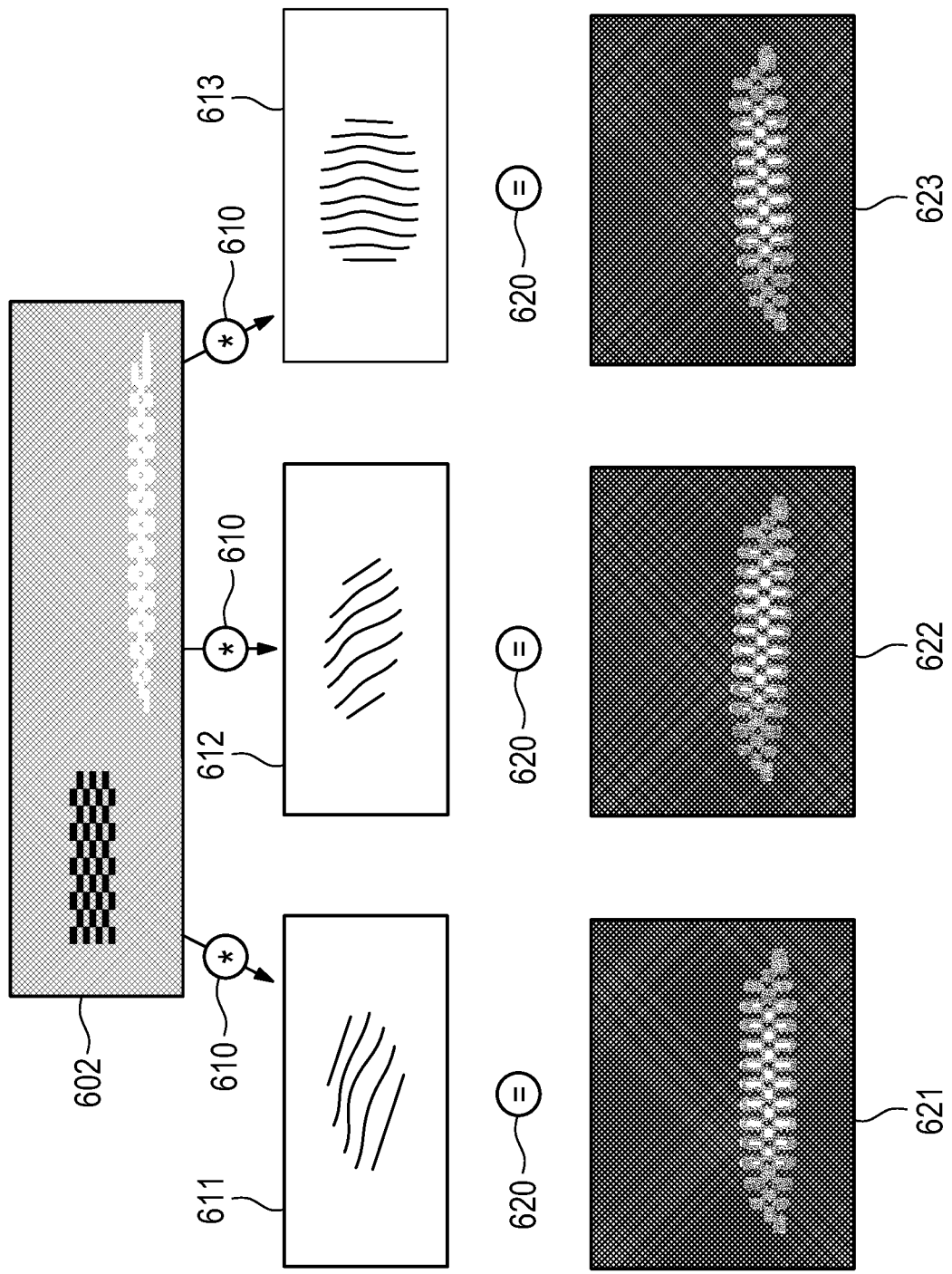
FIG. 6 schematically shows the relationship between the selection of a Gabor wavelet and the resultant projected checkerboard pattern according to a method of an embodiment of the invention.

FIG. 6 schematically shows the relationship between the selection of a Gabor wavelet and the resulting projected checkerboard pattern. If the test image 602 were to be imaged by means of a respective Gabor wavelet 611, 612, 613 by way of image processing 610, the result 620 would be an image of the projected checkerboard pattern, as illustrated in images 621, 622, 623. In detail, a wavelength of 5 with an orientation angle of 55 degrees was selected for the Gabor wavelet 611, a wavelength of 7 with an orientation angle of 25 degrees was selected for the Gabor wavelet 612 and a wavelength of 9 with an orientation angle of 5 degrees was selected for the Gabor wavelet 613. The angle and the distance of the projected checkerboard pattern in the image emerges accordingly.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for segmenting a projected pattern in an image recorded by a camera, the method comprising:
   recording, by a camera in a learning phase, a multiplicity of images produced by virtue of a light source projecting the pattern from a plurality of different angles onto a projection surface in a clean room, wherein the projection surface has a plurality of respectively different distances from the light source for each angle,
   transforming the multiplicity of images into a frequency domain representation,
   obtaining a value range of occurring frequencies from the frequency domain representation of the multiplicity of images, and
   masking, in an application phase, frequencies other than the occurring frequencies lying in the value range in a frequency domain representation of the image recorded by the camera, wherein a difference image produced in this manner is transformed back from the frequency domain representation.

2. The method as claimed in claim 1, wherein the multiplicity of images obtained in the learning phase form a ground truth and a frequency corridor is determined therefrom.

3. The method as claimed in claim 1, wherein a headlamp of a motor vehicle is selected as a light source.

4. The method as claimed in claim 1, wherein transforming the multiplicity of images into the frequency domain representation is carried out using a Fast Fourier Transform.

5. The method as claimed in claim 1, wherein a back transformation from the frequency domain is carried out using an inverse Fast Fourier Transform.

6. The method as claimed in claim 1, wherein angles and distances used to produce the multiplicity of images are selected with a systematic increment between a respectively smallest value and a respectively largest value.

7. The method as claimed in claim 1, wherein a reference map is created in the learning phase with aid of the frequency domain representation of the multiplicity of images, wherein the reference map assigns the frequency domain representation of the image to an angle and distance of the projected pattern.

8. The method as claimed in claim 1, wherein a distance of the projected pattern, which consists of a checkerboard pattern, corresponds to a frequency in the frequency domain.

9. The method as claimed in claim 7, wherein, using a reference map, at least one angle with at least one frequency is determined from the frequency domain representation of the image recorded by the camera in the application phase, frequencies other than the occurring frequencies lying in the value range having been masked in the image, a suitable set of Gabor wavelets for further image processing being selected based on the at least one angle with the at least one frequency.

* * * * *